United States Patent [19]

Emms

[11] 3,967,507
[45] July 6, 1976

[54] ROLLER CLUTCH DRIVE COMPONENT
[75] Inventor: Desmond John Emms, Solihull, England
[73] Assignee: The Lucas Electrical Company Limited, Birmingham, England
[22] Filed: Mar. 13, 1975
[21] Appl. No.: 558,161

[30] Foreign Application Priority Data
Mar. 29, 1974 United Kingdom............... 14197/74

[52] U.S. Cl............................................ 74/6; 192/45
[51] Int. Cl.² ................... F02N 11/02; F16D 41/06
[58] Field of Search ........................ 74/6; 192/42, 45

[56] References Cited
UNITED STATES PATENTS
| | | | |
|---|---|---|---|
| 2,192,434 | 3/1940 | Critchfield | 74/6 X |
| 2,759,364 | 8/1956 | Lewis | 74/6 |
| 3,140,617 | 7/1964 | Palmer | 74/6 |
| 3,814,223 | 6/1974 | Toulier | 74/6 X |

Primary Examiner—Allan D. Herrmann
Attorney, Agent, or Firm—Olson, Trexler, Wolters, Bushnell & Fosse, Ltd.

[57] ABSTRACT

A drive component of a roller clutch assembly for use in an internal combustion engine starter motor includes an annulus formed internally with a cam form which in use is engaged by rollers of the clutch assembly. The component further includes a sleeve which is formed from non-magnetic material and which is provided with internal splines. The annulus and the sleeve are positioned with their axes co-extensive, and the sleeve is formed with an integral flange. The flange of the sleeve has therein a plurality of recesses, and the annulus includes a plurality of projections which are received in respective recesses of the flange of the sleeve. The interengagement of the projections and the corresponding recesses couples the sleeve and the annulus for rotation.

3 Claims, 4 Drawing Figures

U.S. Patent   July 6, 1976   3,967,507

ROLLER CLUTCH DRIVE COMPONENT

This invention relates to the drive component of a roller clutch assembly for use in an internal combustion engine starter motor.

A roller clutch drive component according to the invention includes an annulus formed internally with a cam form engaged in use by rollers of the clutch assembly and a sleeve formed from non-magnetic material having internal splines, said annulus and said sleeve being positioned with their axes coextensive and the sleeve including an integral flange having therein recesses which receive respective projections of the annulus, the projections and corresponding recesses coupling the sleeve and the annulus for rotation.

Preferably said sleeve and said annulus are held, in use, against axial displacement relative to one another by a housing of the clutch assembly.

Figure 1:
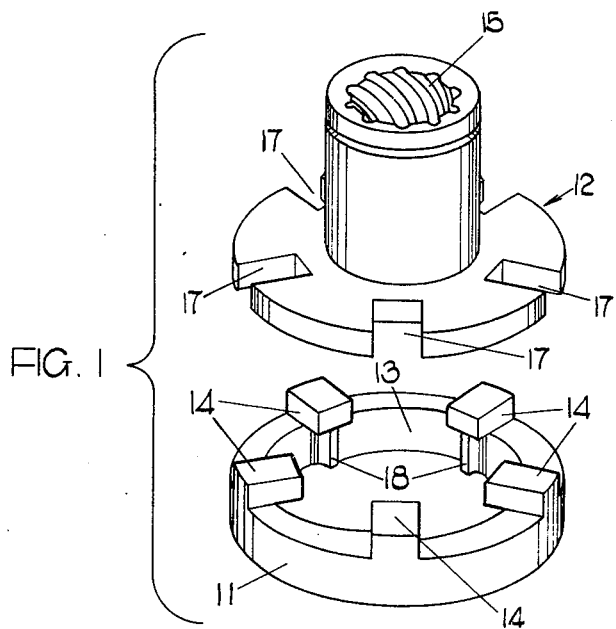
Figure 2:
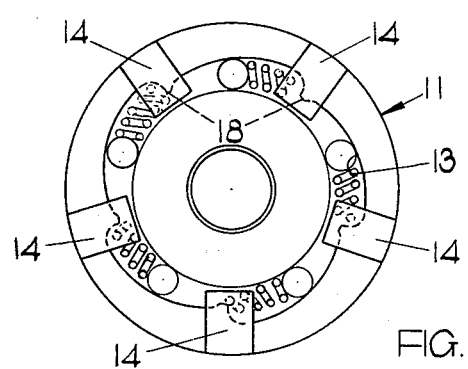
Figure 4:
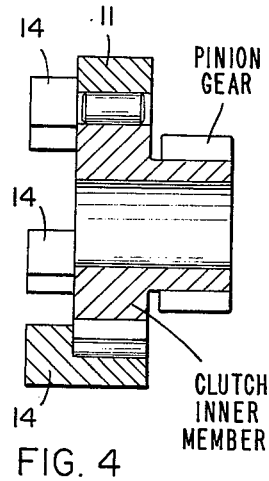
Figure 3:
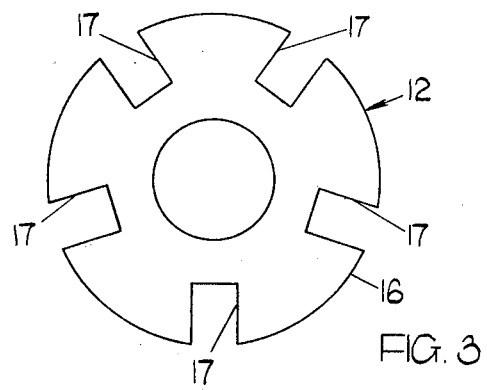

One example of the invention is illustrated in the accompanying drawings wherein:

FIG. 1 is a diagrammatic, exploded view of the drive component of a roller clutch assembly, FIG. 2 is an end view of the roller clutch assembly with part thereof omitted, FIG. 3 is an end view of the other component shown in FIG. 1 and FIG. 4 is a sectional view of the part of the assembly shown in FIG. 2. Referring to the drawings, the drive component for an internal combustion engine starter motor, roller clutch assembly comprises a steel annulus 11 and a moulded synthetic resin sleeve 12. The annulus 11 is formed on its inner periphery with a cam form 13 which in use co-operates with compression springs and rollers of the roller clutch assembly. Furthermore, in use within the annulus 13 is positioned part of the driven component of the roller clutch, and the rollers together with the cam form 13 prevent rotation of the driven member relative to the annulus 11 in one direction while permitting relative rotation in the opposite direction. The nature of the cam form 13 is conventional, and forms no part of the present invention.

Extending from one axial end of the annulus 13 and spaced around the circumference thereof are a plurality of integral projections 14 which conveniently are of rectangular cross section, but which can take a number of different forms.

The sleeve 12 is moulded in synthetic resin, and is formed with internal helical splines 15 whereby the sleeve 12 can be mounted on a similarly splined shaft for controlled angular and axial movement relative to the shaft. Integral with the sleeve 12 and at one axial end thereof is a flange 16 extending at right angles to the axis of the sleeve 12 and formed with a plurality of rectangular apertures 17. The apertures 17 correspond in shape, number, and position to the projections 14 of the annulus 11, and the annulus 11 and sleeve 12 can be inter-engaged by positioning them with their axes coextensive, and with the projections 14 engaged in respective apertures 17. It would be appreciated that the interengagement of the projections 14 and apertures 17 is effective in providing a torque transmitting coupling between the sleeve 12 and the annulus 11.

As stated above the projections, and the corresponding aperture 17 can take a wide variety of different shapes, and in a modification of the arrangement shown the projections 14 are of a form similar to, and coextensive with the radially projecting portions 18 of the cam form 13. The portions 18 of the cam form act as spring abutments, and since the portions 18 and projections 14 are coextensive the annulus can be formed relatively simply by powder metallurgy or by cold or hot impact extrusion methods.

It will be appreciated that the material from which the annulus 11 is formed is governed by the required strength and wear resistance of the drive part of the roller clutch assembly. The two part construction gives a degree of latitude in the choice of material for the sleeve 12, and while the sleeve 12 can be non-magnetic so as to fulfill certain additional requirements within the starter motor with which the roller clutch is to be associated, it will be appreciated that the sleeve 12 could if desired be formed from aluminium, or other non-magnetic materials either by a matching operation, from a solid blank, or by a sintering operation starting with powdered material. Thus the sleeve part of the drive component can be formed very simply from materials which would not be suitable for the annulus of the drive component. It will be appreciated, that the annulus can also be formed very simply either by an impact extrusion operation, a machining operation, or a sintering operation starting from powdered material, bearing in mind the final requirements in terms of strength and wear resistance of the annulus.

In use the annulus 11 and sleeve 12 are interengaged as described above, and the driven component, rollers, and compression springs of the clutch are inserted into the annulus from its end remote from the sleeve 12. A housing is then engaged with the assembly, and abuts a region of the driven component at its end remote from the sleeve 12. The housing is then spun over to engage the face of the flange 16 remote from the annulus, and so holds the annulus and sleeve against axial separation. The roller clutch assembly is then mounted on the rotor shaft of a starting motor, with the splines 15 engaging similar splines on the rotor shaft. Abutments are provided on the shaft to limit axial movement of the roller clutch assembly relative to the shaft, and it will be appreciated that when an abutment on the shaft is engaged by the roller clutch assembly, preventing further axial movement, then the splined connection between the sleeve 12 and the rotor shaft ensures that the roller clutch assembly rotates with the rotor shaft.

In some Applications, the splines 15 and the corresponding splines on the rotor shaft can, if desired, be axially extending splines.

The provision of the projections 14 on the annulus and the apertures 17 on the flange simplifies the production and tooling problems associated with the manufacture of both components. Additionally the problem of ensuring that the flange and annulus are concentric when interengaged is minimised since the arrangement facilitates accurate production of the mating parts.

I claim:

1. A roller clutch drive component including an annulus formed internally with a cam form engaged in use by rollers of the clutch assembly, and, a sleeve formed from non-magnetic material the sleeve having internal splines thereon, said annulus and said sleeve being positioned with their axes co-extensive and the sleeve including an integral flange which is apertured, the apertures of the flange receiving projections integral with and extending axially from the annulus, so as to interconnect the annulus and the sleeve for rotation as one, and the annulus including a plurality of circumferentially spaced integral spring abutment portions, each spring abutment portion projecting radially inwardly from the inner periphery of the annulus and extending axially of the annulus in alignment with a respective one of said integral projections of the annulus.

2. A roller clutch drive component as claimed in claim 1 wherein said sleeve and said annulus are held, in use, against axial displacement relative to one another by a housing of the clutch assembly.

3. A roller clutch component as claimed in claim 1 wherein said integral axial projections and said spring abutment portions having a similar cross-sectional form.

* * * * *